Nov. 17, 1942.    R. E. REASON    2,302,572
OPTICAL MEASURING OR TESTING APPARATUS
Original Filed June 1, 1938    6 Sheets-Sheet 1

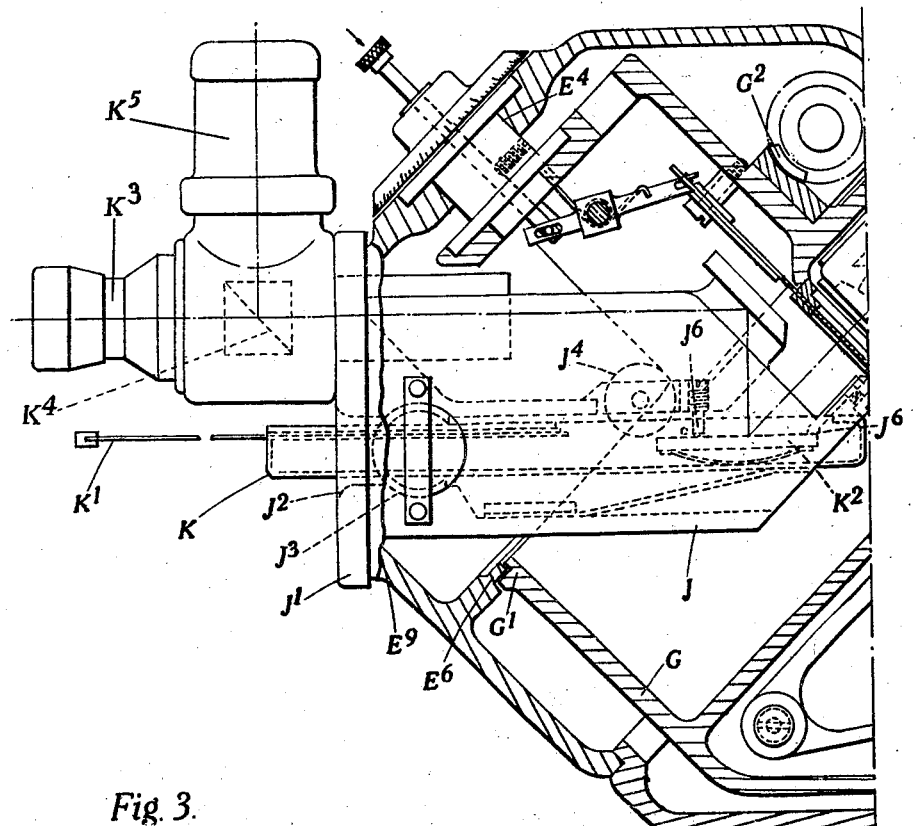
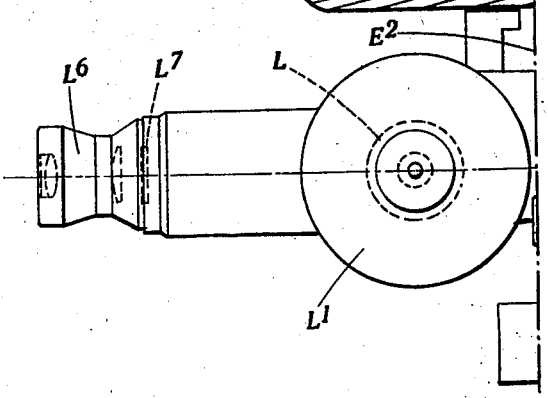
Fig. 3.

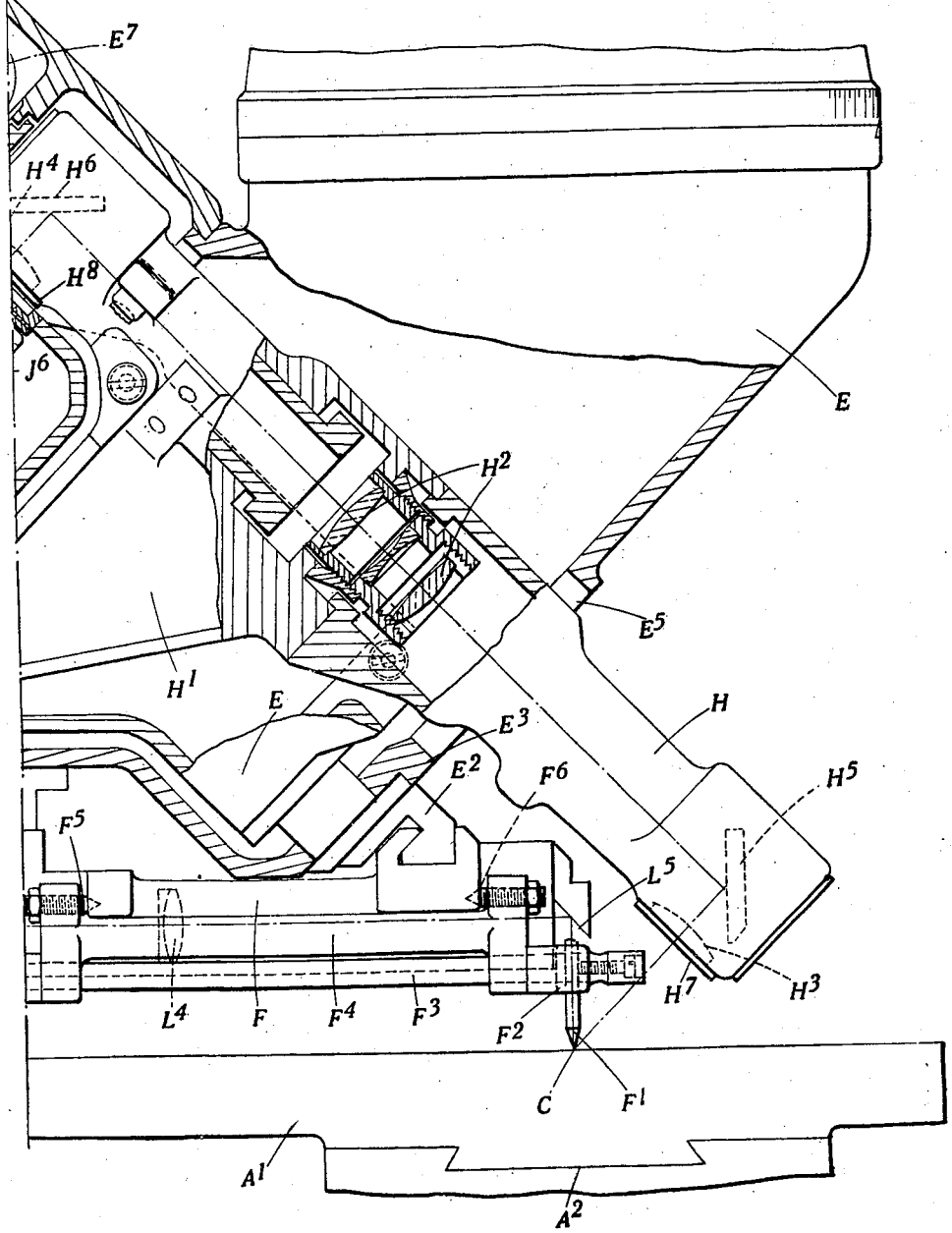

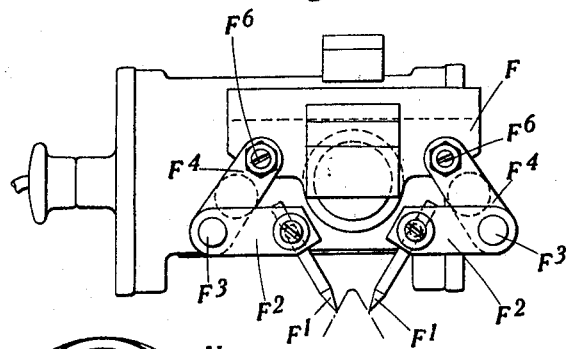
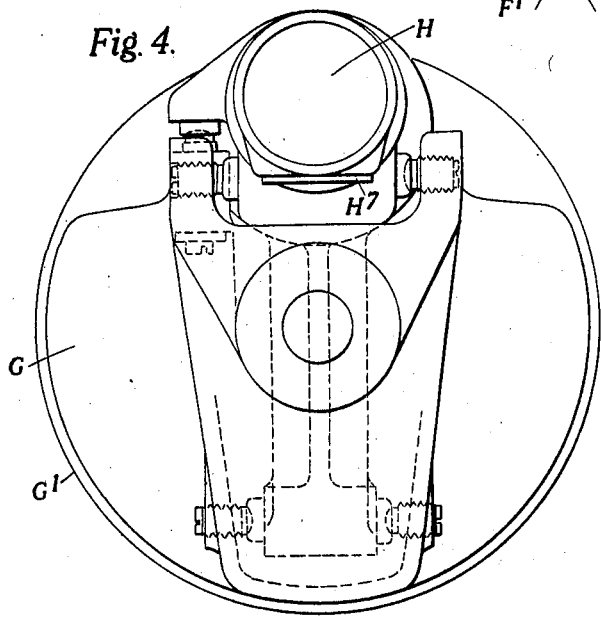
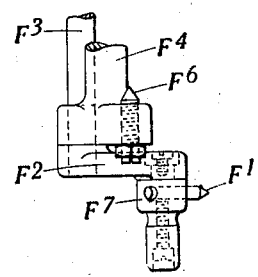
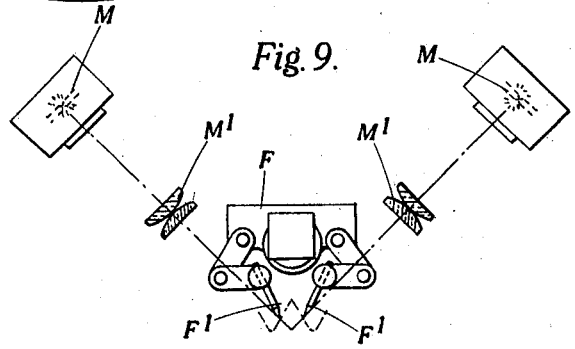

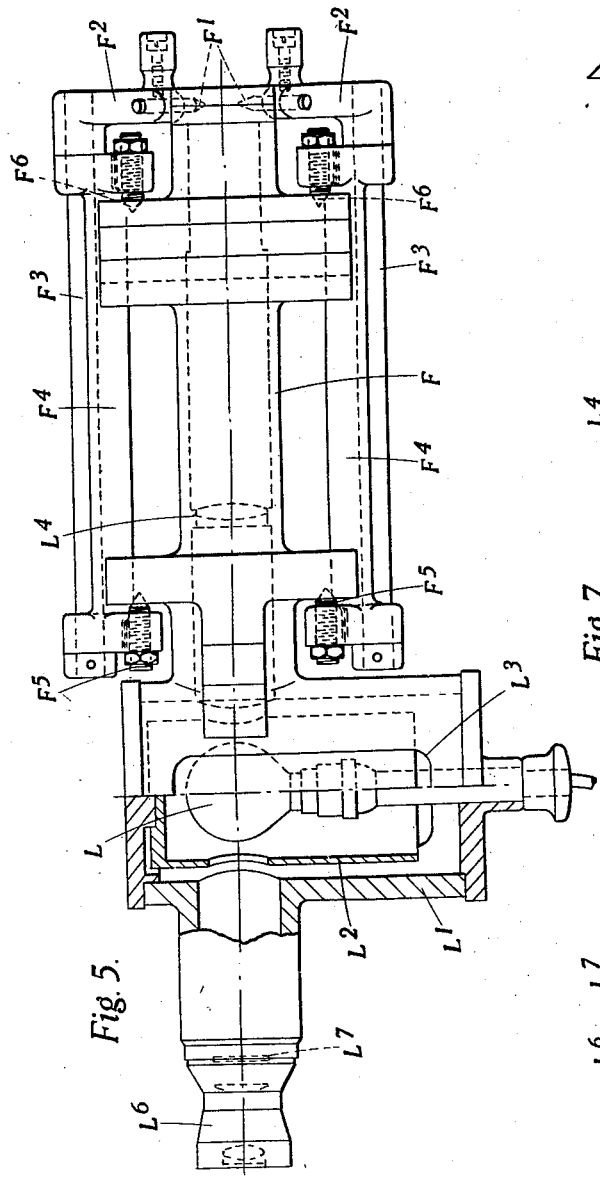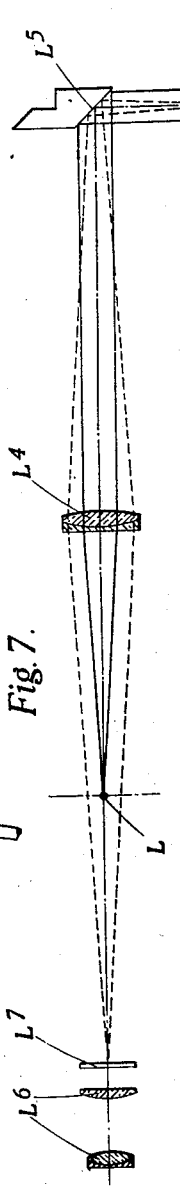

Patented Nov. 17, 1942

2,302,572

UNITED STATES PATENT OFFICE 2,302,572

OPTICAL MEASURING OR TESTING APPARATUS

Richard Edmund Reason, Leicester, England, assignor to Kapella Limited, Leicester, England, a company of Great Britain Original application June 1, 1938, Serial No. 211,231. Divided and this application June 4, 1940, Serial No. 338,692

12 Claims. (Cl. 88—24)

This application is divisional from United States of America patent application Serial No. 211,231 filed June 1, 1938, and which has become Patent 2,256,102, dated September 16, 1941.

The invention relates to optical measuring or testing apparatus and is more particularly concerned with the measurement or testing of plane section profiles of manufactured articles or of appliances used in their manufacture, such for example as screwthreads or hobs or thread gauges.

Hitherto precision measurement of screwthreads has usually been effected optically by what may be termed "shadow projection," by directing a beam of parallel light at an angle to the axis of the thread equal to the pitch angle, so that a shadow of the thread is thrown on to a screen through a magnifying projecting lens. Such an arrangement will often suffice for simple thread surfaces, but is necessarily limited in its practical application owing to the fact that in many instances other parts of the screwthread or other object under examination are interposed in the path of the beam of light.

The primary object of the invention is to provide an improved optical apparatus for effecting precision measurement or testing, which will be of much more general applicability than the known shadow projection arrangement, and will effect the desired measurement with a very high degree of accuracy.

Figure 1:
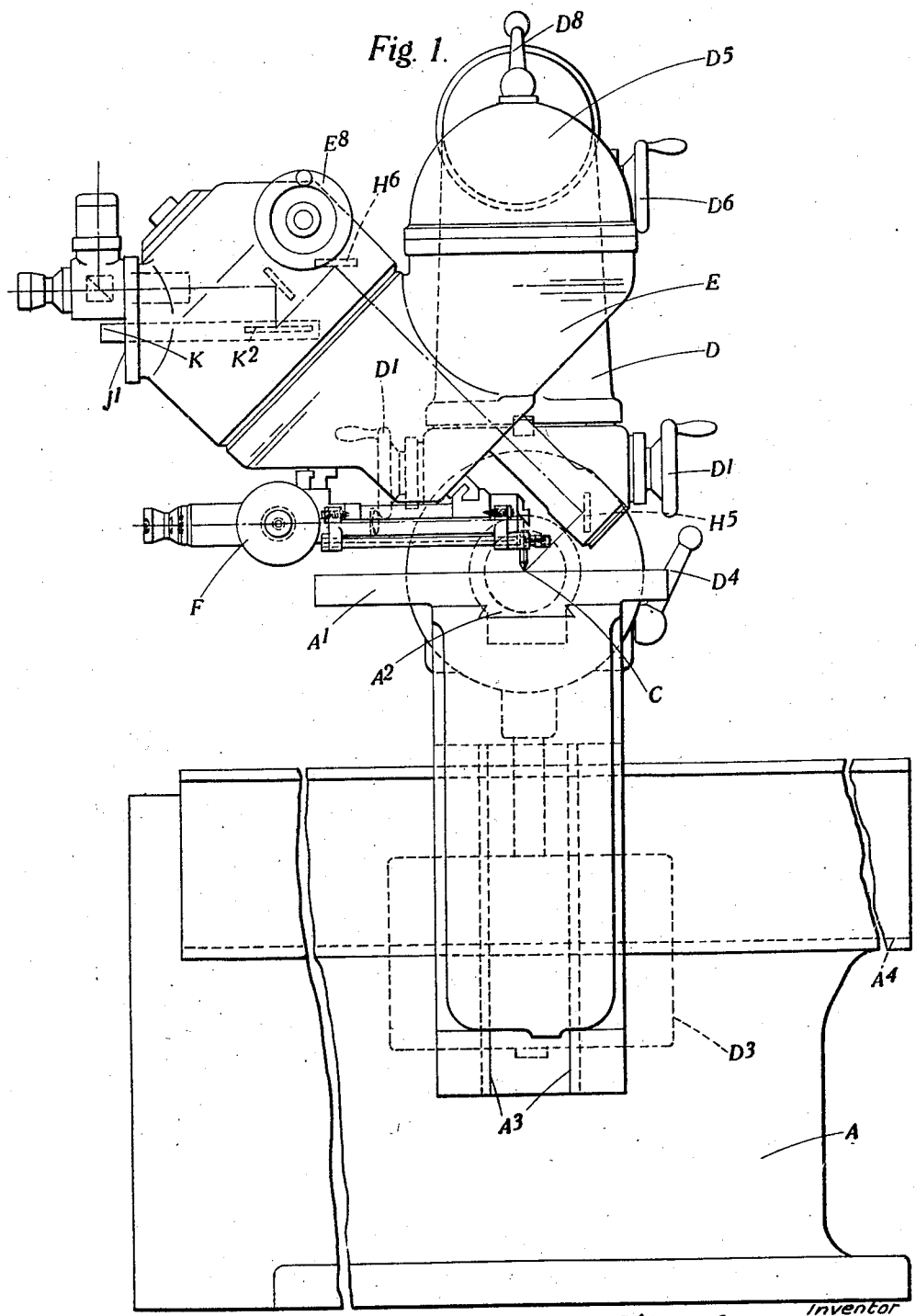
Figure 2:
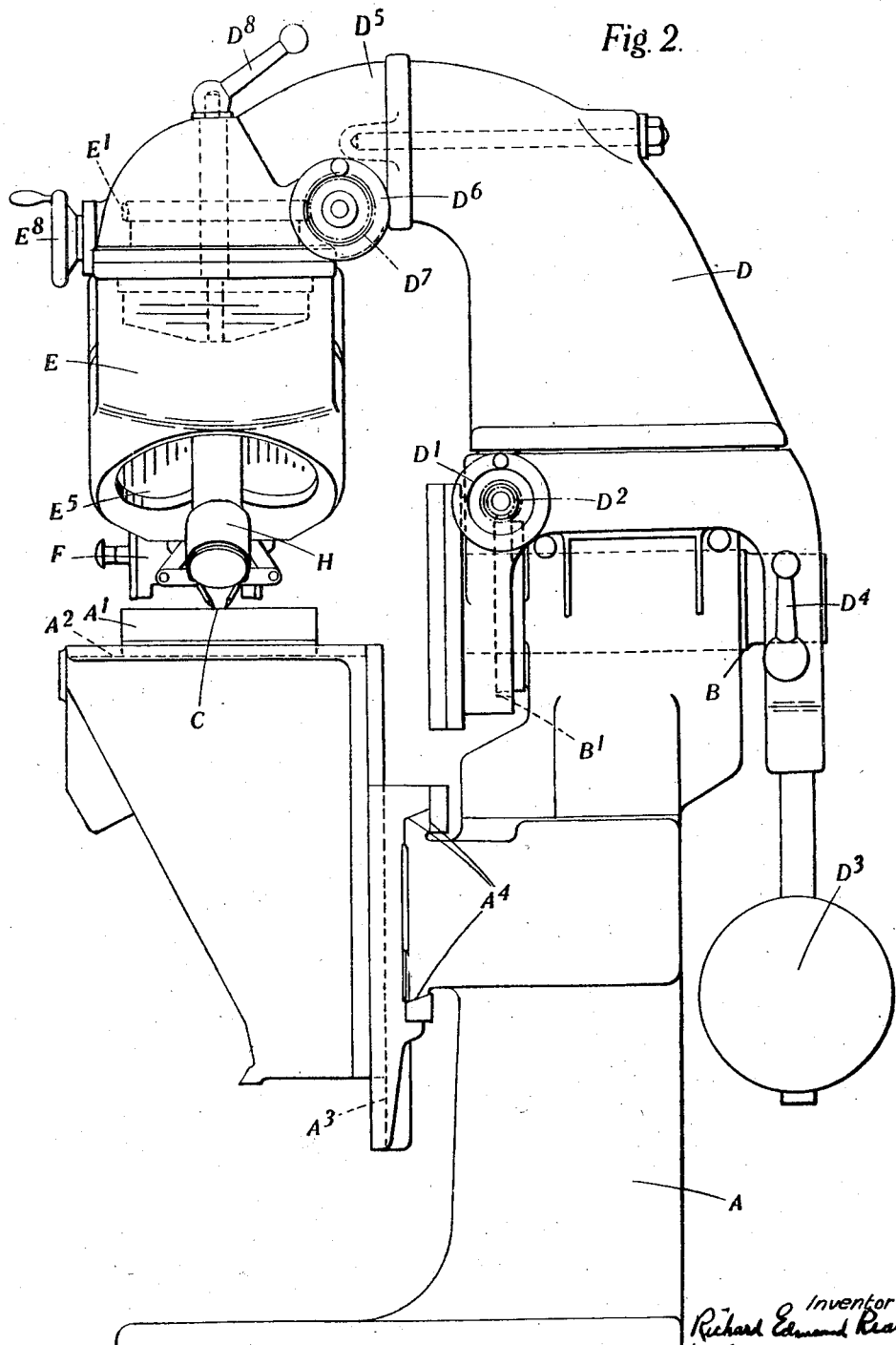

Further objects of the invention will be apparent from the following description of the accompanying drawings, which show a preferred construction of apparatus according to the invention, embodying also features of my said application Serial No. 211,231, and of my applications Serial Nos. 279,253 filed June 15, 1939, and 338,691, filed June 4, 1940, now Patent 2,256,103, dated September 16, 1941, both of which are also divisional from application Serial No. 211,231. In these drawings, Figures 1 and 2 are respectively front and side elevations of the complete apparatus, Figure 3 is a sectional view on an enlarged scale of the optical head forming part of the apparatus, Figure 4 is an end view of the rotor in the optical head, Figures 5 and 6 show respectively in horizontal section and in end elevation the scribing unit carried by the optical head, Figure 7 is a diagram illustrating the optical system of the scribing unit, Figure 8 shows a modification of part of the scribing unit, and Figure 9 illustrates a further modification of the scribing unit.

In the construction of Figures 1–7, the apparatus comprises a fixed base A from the front of which projects a work table $A^1$ for carrying the object under examination, this table being supported on three slideways $A^2$, $A^3$, $A^4$ so that it can be adjusted in three mutually perpendicular directions. Behind the work table $A^1$, the base carries a fixed horizontal shaft B, the axis of which passes through a normal zero point C over the work table $A^1$. The shaft B serves as a bearing for the rotation of a hood D under the control of a pair of handwheels $D^1$ on the hood, these handwheels carrying a worm $D^2$ which engages with a worm wheel $B^1$ on the shaft B. A counterweight $D^3$ is provided to balance the weight of the hood and the parts carried thereby, and the hood can be clamped in any desired position under the control of the clamping handle $D^4$.

From the upper end of the hood D, a neck portion $D^5$ projects forwardly and carries rotatably a casing E, which may be termed the optical head, the axis of rotation of which intersects the axis of the main horizontal shaft B at right angles at the normal zero point C above the work table $A^1$. The rotation of the optical head E about its axis on the neck portion $D^5$ is controlled by a handwheel $D^6$ operating through a worm $D^7$ and worm wheel $E^1$, and a clamping handle $D^8$ is provided to lock the head in any chosen position of adjustment. As will be clear from the following description of the optical head E itself, the scribing plane always passes through the axis of rotation of the head in the neck portion $D^5$, so that the two rotational adjustments above described enable the scribing plane to occupy any desired position (within convenient limits) through the zero point C, thereby rendering the apparatus suitable for examining a wide variety of shapes and sizes of object on the work table $A^1$, which can be adjusted in the manner above described to bring any desired point on the object to the zero point C.

The optical head E carries on its underside two guides $E^2$ into which can be fitted a detachable scribing unit F, and has within it a rotor G for carrying the optical projection unit H and also a plate box J for accommodating the photographic plate for receiving the projected image. The head E is provided in its end walls with bearings E³, E⁴ for the rotor G, the axis of rotation lying at an angle of 45° to the axis of rotation of the head in a plane at right angles to the scribing plane, these axes intersecting in the normal zero point C above the work-table A¹. Adjacent to the lower bearing E³ the head E has an arcuate opening E⁵, through which the end of the projection unit H projects, and in order to prevent stray light from this opening from passing to the upper end of the head containing the plate box J, the head has an internal stepped flange E⁶ which lies in close proximity to a rib G¹ on the rotor G. The rotor carries a segmental worm rack G², with which engages a worm E⁷ operated by a handwheel E⁸ outside the head. The projection unit H, which is of generally tubular form, is for convenience made separate from the rotor G and is so mounted in the lower portion of the rotor as to enable its position therein to be adjusted with a high degree of accuracy.

The tubular portion of the projection unit houses the projecting lens system which is arranged in the manner described in application Serial No. 279,253, above mentioned, and comprises a central projecting lens H² disposed symmetrically between two collimating lenses H³, H⁴ whose principal focal points coincide with the nodal points of the projecting lens H², the arrangement being such as to give a rectified image at unit magnification. Two plane mirrors H⁵, H⁶ at 45° to the axis of the projecting lens H² are disposed in the ends of the unit to deflect the optical axis at right angles respectively through the two collimating lenses H³, H⁴ which are disposed adjacent to lateral openings H⁷, H⁸ in the wall of the unit. The optical axes of the collimating lenses H³, H⁴ intersect the axis of rotation of the rotor G at right angles, such axis being parallel to the optical axis of the projecting lens H². The projection unit H is so disposed that the axis of the lower collimating lens H³ intersects the scribing plane at 45° at the same point as the axis of rotation of the rotor G. The image plane of the projecting lens system passes through the point of intersection of the optical axis of the upper collimating lens H⁴ and the axis of rotation of the rotor G and lies at 45° to both axes, so that it is at right angles to the scribing plane.

The plate box J fits tightly into an opening E⁹ in the wall of the head E and has a flange J¹ making a light-tight joint around such opening. The box has an opening J² through which a plate slide K can be inserted in suitable guides J³, J⁴ and springs are provided whereby, when the shutter K¹ of the plate slide K has been opened, the photographic plate K² is caused to move into engagement with fixed stops J⁶ which position it accurately in the image plane of the projecting lens system.

The plate box J also carries an eyepiece K³ for direct viewing of the image, a diffusing screen being substituted for the photographic plate K² when such direct viewing device is to be used. A semi-transparent reflector K⁴ is interposed in the direct viewing device to permit an illuminated graticule to be focussed on the image for measuring purposes, the graticule together with a suitable lamp being contained in a housing K⁵ above the eye-piece.

The scribing device F, the casing of which can be fitted on to the guides E² underneath the optical head E, is provided with two scribers F¹, and since they are similar to one another and are similarly arranged one on either side of the end of the casing of the device, it will suffice to describe the mounting of one only. Each scriber F¹ is clamped to a crank arm F² on a spindle F³ journalled in a framework F⁴ pivoted to the casing of the device and permitting the scriber to be moved by hand as desired during use. The axes of the two spindles F³ and of the two sets of pivots F⁵, F⁶ are all accurately parallel to one another and to the longitudinal axis of the casing of the device, which is coplanar with the axis of rotation of the rotor G in the optical head E, and the longitudinal position of the scribers F¹ on the device is such that the two scribers are constrained to move only in a plane which defines the section profile and constitutes the scribing plane above mentioned.

For illuminating the scribed mark, a lamp L is provided in a lamp housing L¹ forming part of the casing, a heat-insulating screen L² being provided around the lamp, in order in conjunction with ventilating openings L³ in the housing L¹ to minimise the generation of heat and thereby to avoid heat-disturbance of the adjacent optical elements. A condenser L⁴ is provided to give a parallel or slightly convergent beam which after reflection in an inclined mirror L⁵ is directed on to the scribed mark.

The same condenser and mirror can be utilised in conjunction with an eye-piece L⁶ and graticule L⁷ for viewing the scribed mark, the lamp L being movable out of the path of the rays when the mark is to be viewed. The eye-piece and graticule are so mounted that the graticule is focussed more or less accurately on the surface of the object by the condenser L⁴.

Although two scribers are employed in this arrangement in order not to interfere with the optical parts for viewing and illuminating the mark, it will be appreciated that a single scriber will often suffice. In this case as shown in Figure 8 the scriber F¹, instead of being clamped directly to its link F² is clamped to a block F⁷ rotatably mounted on such link, so that the scriber can be turned and clamped in any convenient angular position in the scribing plane.

In a further modification shown in Figure 9 independent means are provided for illuminating the scribed line, instead of employing a lamp in the casing of the scribing device. In this modification two (or more) powerful arc lamps M are employed each in association with a condenser M¹ for giving very intense illumination of the surface of the object around the scribed mark, such surface preferably being whitened to increase the brightness of the illumination.

In the foregoing arrangement the projected image is obtained photographically at unit magnification, but it will often be preferred, if sufficient illumination is available to project the image (preferably on an enlarged scale) on to a diffusing screen.

It will be appreciated that the foregoing arrangement has been described by way of example only, and that the invention may be carried into practice in other ways. Thus, for instance, the preferred form of optical projecting device above described may, if desired, be replaced by one or other of the alternative forms of projecting device described in application Serial No. 211,231 above mentioned.

What I claim as my invention and desire to secure by Letters Patent is:

1. Optical apparatus for testing or measuring the profile of the section in which a shaped object is cut by a section plane, comprising in combination with the object, a scribing device having a scribing point which can be moved to mark the surface of the object, and means for constraining the movement of such scribing point to effect its marking on the surface of the object solely in a plane intersecting the object surface in the desired profile, and an optical projecting device sighted on the scribing point and mounted in such predetermined relationship to the scribing device that its image plane is conjugate to the section plane, the projecting device acting to project an accurately focussed image of the section profile marked on the surface of the object.

2. For use in optical apparatus for testing or measuring the profile of the section in which a shaped object is cut by a section plane, such apparatus comprising an optical projecting device for projecting an accurately focussed image of the plane section profile and a support for such device, a detachable scribing unit for defining the plane section profile on the surface of the object, such unit comprising a casing, bearings so carried by the casing as to be rotatable about an axis parallel to their own axis, a spindle rotatable in such bearings, a crank arm on the spindle, a scribing point carried by the crank arm, whereby the movements of the scribing point are strictly confined to a plane perpendicular to the bearing axis, and means on the casing whereby the unit can be attached to the projecting device support in such a position that the scribing plane is accurately conjugate to the image plane of the projecting device.

3. The combination with the features set forth in claim 2, of means carried by the casing for illuminating the surface of the object.

4. The combination with the features set forth in claim 2, of an optical system carried by the casing for visual observation of the mark made by the scribing point.

5. The combination with the features set forth in claim 2, of illuminating means carried by the casing, an optical system in the casing for directing the light from the illuminating means on to the surface of the object, and an eyepiece co-operating with such optical system for permitting visual observation of the mark made by the scribing point.

6. Optical apparatus as claimed in claim 1, in which the optical projecting device is so mounted as to view the marked profile in a direction oblique to the scribing plane.

7. Optical apparatus for testing or measuring the profile of the section in which a shaped object is cut by a section plane, comprising a scribing device for marking the surface of the object, means for constraining the scribing device to effect its marking solely in a plane whereby the profile of the section in which the object is cut by such scribing plane will be marked on the surface, a rectifying oblique optical projecting device for projecting in a direction oblique to the section plane a rectified image of the marked profile free from distortion due to the oblique projection, and means for mounting the two devices whereby the scribing plane is conjugate to the image plane of the projecting device.

8. The combination with the features set forth in claim 7, of means for rotating the optical projecting device about an axis passing through the point of intersection of its optical axis with the section plane.

9. The combination with the features set forth in claim 7, of means for rotating the optical projecting device about an axis passing through the point of intersection of its optical axis with the section plane, and reflectors so arranged in the projecting device that the image plane remains stationary and that the portion of the axis of rotation adjacent to its point of intersection with the image plane is an image of the portion of such axis adjacent to its point of intersection with the section plane.

10. The combination with the features set forth in claim 1, of a work support for carrying the object, an optical head carrying the projecting device and the scribing device, and means whereby relative rotational movements about two mutually perpendicular axes can be imparted to the optical head and the work support.

11. The combination with the features set forth in claim 7, of a work support for carrying the object, an optical head carrying the projecting device and the scribing device, and means whereby relative rotational movements about two mutually perpendicular axes can be imparted to the optical head and the work support.

12. The combination with the features set forth in claim 7, of a work support for carrying the object, an optical head carrying the projecting device and the scribing device, and means whereby relative rotational movements about two mutually perpendicular axes can be imparted to the optical head and the work support, one of such axes of rotation lying in the scribing plane and passing through the point of intersection of the optical axis of the projecting device with the scribing plane.

RICHARD EDMUND REASON.